R. VOSE.
Car Spring.
No. 28,703.
Fig. 1.
Patented June 12, 1860.
Fig. 2.
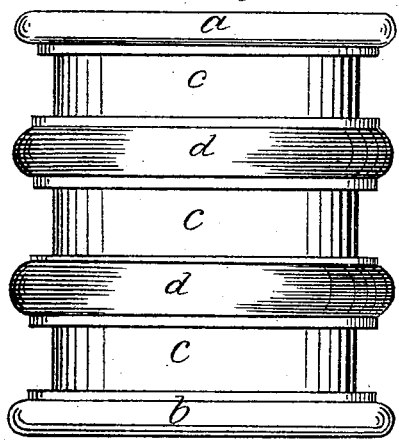
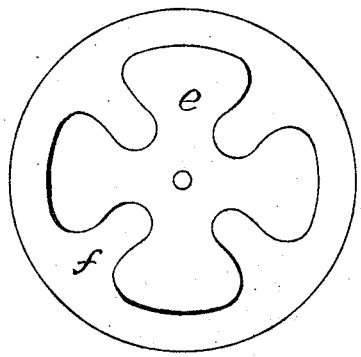
Fig. 3.
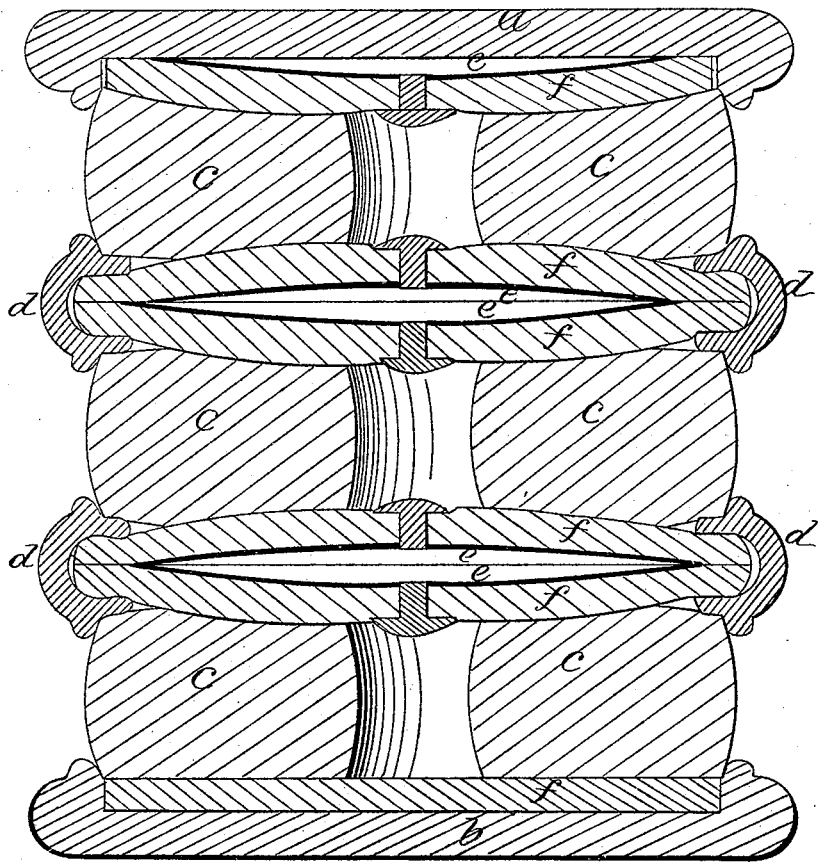
Witnesses:
W. Yorke At Lee
John W. Chute
Z. C. Robbins
att'y for Richard Vose
AM. PHOTO-LITHO. CO. N.Y. (OSBORNE'S PROCESS.)

UNITED STATES PATENT OFFICE.

RICHARD VOSE, OF NEW YORK, N. Y.

CAR-SPRING.

Specification of Letters Patent No. 28,703, dated June 12, 1860.

*To all whom it may concern:*

Be it known that I, RICHARD VOSE, of the city, county, and State of New York, have invented a new and Improved Car-Spring; and I do hereby declare that the following is a full and exact description thereof, reference being had to the accompanying drawings, which form a portion of this specification.

The feature of novelty in my improved car-spring consists in its being essentially composed of disks ($c$ $c$) of india rubber and concavo-convex metallic springs ($e$, $e$,) arranged with metallic caps ($a$, $b$,) and internally grooved metallic rings ($d$, $d$,) in such a manner that the two descriptions of springs are enabled to act and re-act upon each other, the said combination developing a steadier and an easier elastic movement than can be produced by the separate use of either of the said system of springs, and producing, it is believed, a cheaper and more durable car-spring than has ever before been produced.

In the accompanying drawings Figure 1, is a side view of my improved car-spring; Fig. 2, a top view of detached portions of the same; and Fig. 3, a section of said spring.

To prevent the metallic springs $e$, $e$, from being injured by coming in direct contact with the india rubber disks $c$, $c$, I interpose between the said springs, disks $f$, $f$, of leather, or felting, or some other fibrous material. And for the purpose of keeping the said metallic springs in their proper positions, and at the same time preserving them from the injurious effects of moisture, I secure the said springs to the fibrous disks $f$, $f$, by means of contral rivets, and then closely pack the peripheries of each pair of said disks within one of the metallic rings $d$, $d$, whose rabbeted upper and lower sides furnish the desired forms of seats for the reception of the india rubber disks $c$, $c$.

The india rubber springs $c$, $c$, and the metallic springs $e$, $e$, of my improved car-spring, should be so proportioned with respect to each other, that the action and re-action of the one upon the other will afford mutual protection against injury when exposed to severe concussive strains; and when thus proportioned, an elastic movement is attained which cannot be equaled by any other form or arrangement of elastic materials.

What I claim as my invention, and desire to secure by Letters Patent is,—

The arrangement and combination of the india-rubber disks, $c$, $c$, with the concavo-convex metallic springs $e$, $e$, in my improved car-spring, substantially in the manner and for the purpose herein set forth.

The above specification of my improvement in car-springs signed and witnessed this 21st day of May 1860.

RICHARD VOSE.

Witnesses:
Z. C. ROBBINS,
C. H. SLICER.